June 28, 1966 W. S. LANIER 3,258,252
APPARATUS FOR BLENDING FREE-FLOWING GRANULAR MATERIALS
Filed Dec. 17, 1964

INVENTOR.
WAYNE S. LANIER
BY Maurice W. Ryan
ATTORNEY

United States Patent Office 3,258,252
Patented June 28, 1966

3,258,252
APPARATUS FOR BLENDING FREE-FLOWING GRANULAR MATERIALS
Wayne S. Lanier, Texas City, Tex., assignor to Union Carbide Corporation, a corporation of New York
Filed Dec. 17, 1964, Ser. No. 418,988
5 Claims. (Cl. 259—95)

This invention relates to an apparatus for blending free-flowing granular materials.

The need for adequate blending of granular materials has long been recognized in the art, particularly for blending granular products such as synthetic resins, plastics and the like, to achieve a uniform blend or mixture. Many of these granular products when produced vary on one side of the other of a set standard and must be intimately blended with other similar components in order to minimize variations and non-uniformity of the final blend.

To produce an acceptable uniform blend in blending bins it is necessary to intimately commingle all the component resins. Suitable equipment must theerfore positively intermix all the contents of the bin regardless of their respective proportions within the bin.

Heretofore, one disadvantage of using bins for blending granular materials has been that the materials flowing down the bin tend to flow faster down the center, over the outlet, thus causing slower mixing through non-uniform flow. The preferential flow of resin in the center of the bins creates stagnant pockets of resin against the bin walls. Consequently, it is difficult to achieve the desired degree of homogeneity and uniformity in the final blend.

Another apparatus for blending granular materials has been described in U.S. Patent 3,029,986. The apparatus described therein comprises a centrally positioned fenestrated tube enclosed in a chamber having substantially circular horizontal cross-section such as a hopper, bin, tank, etc. A divergent conical baffle is attached to the lower section of the fenestrated tube and defines an annular clearance with the chamber walls through which an amount of granular materials can flow unimpeded. The centrally disposed granular materials flow through the fenestrated tube and are intermixed, proportionately with the peripherally disposed granular materials flowing through said annular clearance. The materials are withdrawn through an outlet disposed at the bottom of the bin and circulated, externally, to the top of the bin to further intermix the granular materials and to achieve the desired degree of homogeneity in the final blend.

The blending apparatus described in the above-mentioned patent produces fines and so-called "streamers," i.e., elongated resin particles. The presence of these in the final blend is, of course, undesirable. Furthermore, the use of external transfer means involves additional expenditure, particularly when large quantities of materials are being handled at relatively high rates as is often the case commercially.

It is therefore an object of this invention to provide an apparatus for uniformly blending free-flowing granular materials. It is a further object of this invention to provide a commercially feasible and economical blending apparatus wherein large quantities of free-flowing granular materials can be uniformly blended to produce a homogeneous blend, essentially free from fines and streamers.

The above and other objects of this invention are accomplished by the use of a blending apparatus comprising a chamber having a centrally positioned fenestrated tube and a baffle attached to the lower end of the fenestrated tube and defining an annular clearance with the chamber walls; an aspirated tube extending through and enclosed by the fenestrated tube; means for introducing air into the aspirated tube; means for disengaging the resin at the top of the aspirated tube; and means for introducing a secondary air stream at a point below the lower end of the aspirated tube.

The invention will be more clearly understood from the attached drawings wherein.

Figure 1:
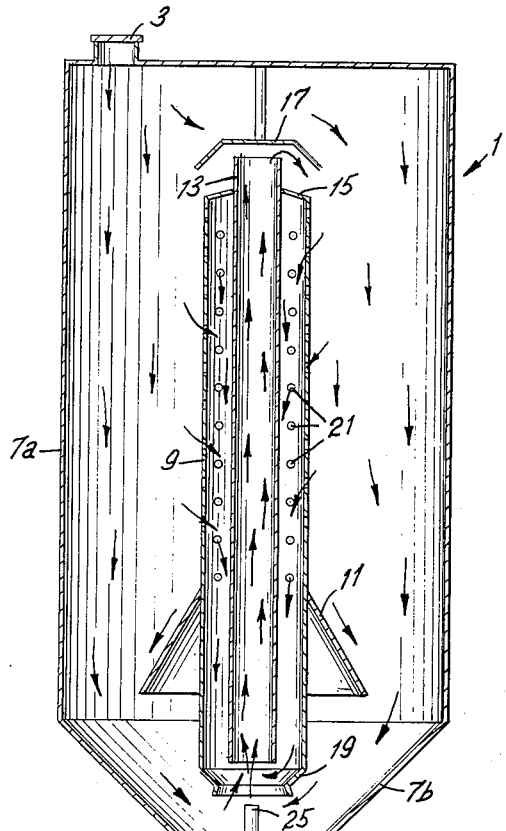
FIGURE 1 is a sectional view, partly in elevation, of a preferred embodiment of this invention.

Referring to the drawings, the apparatus in detail comprises chamber 1 preferably of substantially circular horizontal cross-section which is representative of a silo, hopper, bin, tank or like storage structure for free-flowing granular materials. Chamber 1 is provided with an outlet 3 at the top, outlet 5 at the bottom and extending therebetween a wall comprising a substantially cylindrical upper wall 7a and a substantially conical lower wall 7b.

Mounted in chamber 1 and enclosed by upper wall 7a and lower wall 7b and substantially coaxial therewith is a fenestrated tube 9 spaced above outlet 5 to provide a sufficient clearance between the lower end of fenestrated tube 9 and outlet 5 in order to permit unimpeded flow of the granular material therethrough. Positioned around the fenestrated tube is a baffle 11 shown as a divergent cone whose peripheral edge cooperates with the lower wall 7b to define an annular space through which an amount of granular material can flow unimpeded. Baffle 11 prevents the preferential flow of the resin in the center of the bin above its outlet.

Enclosed by the fenestrated tube 9 and extending coaxially therethrough, there is shown (FIGURE 1) an aspirated tube 13 which defines an annular space with the fenestrated tube 9. The aspirated tube terminates at its lower end at a point slightly above the lower end of the fenestrated tube. At its upper end, the aspirated tube extends above the fenestrated tube as well as above the normal resin level in chamber 1. A metal ring 15, or any other suitable closure device, closes, at the top, the annular space defined by fenestrated tube 9 and aspirated tube 13 as shown in FIGURE 1 in order to prevent flooding of the annulus by the resin. The upper edge of the fenestrated tube is usually located below the normal level of the resin in chamber 1.

The aspirated tube-fenestrated tube assembly may be securely positioned substantially centrally in chamber 1 by well-known means. For example, the assembly may be positioned by tie rods which are welded at one end to the fenestrated tube and at the other end to the walls of the chamber. The means for securing the tubes in position are not shown in the drawing for clarity.

Positioned above the upper end of aspirated tube 13 is a disengaging deflector 17 as shown in FIGURE 1. The disengaging deflector serves to deflect the free-flowing granular materials, air, and fine particles into the large volume at the top of the bin. The greatly decreased velocities in this large volume permits the large granular particles to fall downward while the air, carrying the fine particles, passes upward and out of the chamber by way of outlet 3.

Figure 2:
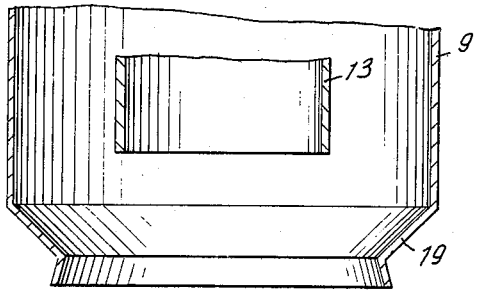
FIGURE 2 is a side view of the lower section of the fenestrated tube-aspirated tube assembly.

An enlarged side view of the lower end of the fenestrated tube is shown in FIGURE 2. Deflector edges 19 are shown forming 45° angles with the vertical sides of the fenestrated tube to deflect the flow of granular materials toward aspirated tube 13. This angle is not narrowly critical in this invention and may vary for different systems so long as the deflecting edges can serve their intended function, i.e., to deflect the resin or the granular materials toward the aspirated tube.

Fenestrated tube 9 is an elongated member provided with a plurality of entrance means 21 sized to permit easy ingress of free-flowing granular materials disposed thereabout without edging. The size of the entrance means is determined by the particular granular material sought to be blended and should, of course, be sufficiently large so that the granular materials can flow therethrough without plugging. The shape of the entrance means is not critical provided that the free flow of the granular materials is not impeded. Ease of fabrication will obviously make certain geometrical shapes, e.g., circular or oval, more preferable than others. Similarly, the number of entrance means is not narrowly critical. The fenestrated tube should, however, contain sufficient number of entrance means in order to permit the flow of a predetermined quantity of free-flowing granular materials therethrough. These entrance means should preferably be equidistantly spaced along substantially the entire length of fenestrated tube 9 not covered by baffle 11 to insure sampling of all layers or portions of the material in chamber 1. Similarly, to insure adequate and representative sampling, the entrance means should also be regularly laterally spaced.

Baffle 11 is made of a rigid material and need not be any particular size. The purpose of this baffle, as previously indicated, is to cooperate with the lower wall 7b of chamber 1 to define an annular space through which the free-flowing granular materials can flow unimpeded. The baffle also prevents the preferential flow of the granular materials in the center of the bin. The slope of the upper surface of baffle 11 desirably forms an angle below the horizontal greater than the angle of repose of the granular materials being blended. Thus, the baffle is rendered self-cleaning.

A conduit 23 extends through the lower section of chamber 1 and terminates near the lower end of aspirated tube 13. At its upper end conduit 23 is provided with a flow-accelerating means 25 such as a nozzle, diffuser, etc. Conduit 27 is shown entering the lower section of chamber 1 at a point opposite the point of entry of conduit 23. Conduit 27 enters chamber 1 at a point below the lower end of aspirated tube 13 and hence below the flow-accelerating means 25.

Figure 3:
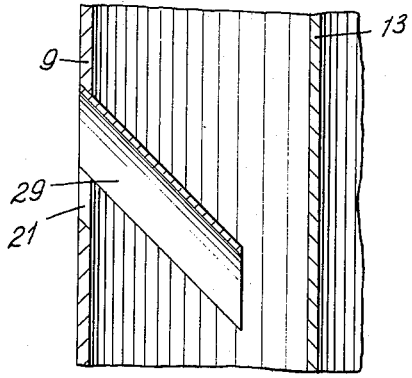
FIGURE 3 is an enlarged side view of the fenestrated tube showing a shrouding device, hereafter referred to as "shroud."

In order to facilitate the flow of granular materials in the annulus defined by fenestrated tube 9 and aspirated tube 13 and prevent possible plugging of the lower entrance means by the granular materials flowing from the upper entrance means, it has been found advantageous to provide the upper half of the entrance means with shrouds such as shown in FIGURE 3. This can be accomplished by welding a small section of aluminum pipe 29, for example, to the upper half of the entrance means. The shrouds are downwardly sloped and protrude sufficiently within the annulus defined by the fenestrated tube and the aspirated tube in order to permit ready flow of the granular materials through said annulus without plugging. The 45° angle illustrated in FIGURE 3 represents one illustrative embodiment. In practice this angle may vary depending upon the angle of repose of the granular material which is being blended in chamber 1. This angle should be at least slightly greater than the angle of repose of the granular material being blended.

Although the use of shrouds in the foregoing manner enhances the flow of the granular materials through the entrance means and prevents their plugging, adequate blending can nevertheless be achieved by enlarging the size of the entrance means without the use of shrouds in conjunction with the entrance means. For more effective blending of the granular materials the use of shrouds has been found to be particularly advantageous.

In operation the free-flowing granular materials which are charged to chamber 1 through entrance means 3 flow through entrance means 21 down through the annulus defined by the fenestrated tube and the aspirated tube, deflected by deflector edges 19 toward aspirated tube 13. The granular materials flow upwardly through the aspirated tube due to the aspirated effect created by the flow of air through conduit 23 and flow-accelerating means 25. The high velocity of air flowing through the flow-accelerating means creates an aspiration effect in the area adjacent to and around the lower end of the aspirated tube. This, in combination with a secondary air stream entering chamber 1 through conduit 27, causes the free-flowing granular materials to flow upwardly through the aspirated tube. The secondary air stream serves to lift the granular materials which may have flowed down past the lower end of the aspirated tube. Substantial amounts of the secondary air thus flows through the aspirated tube due to the aspiration effect referred to above. The remainder of the secondary air stream (about 20 volume percent of the total secondary air) passes up and around the fenestrated tube as well as the annulus and thus serves to maintain the granular materials in a somewhat suspended state. All the air in chamber 1 is vented continuously through outlet 3 of chamber 1.

At the upper end of the aspirated tube, the granular materials are deflected by means of the disengaging deflector and the air stream leaves the chamber through the opening at the top, namely, outlet 3, carrying the fine particles and streamers.

In order to test the homogeneity and uniformity of the blend in chamber 1 sample can be withdrawn periodically through outlet 5, or alternatively, by removing the quantity of the granular materials through the top of the chamber. The blending operation may be curtailed when the desired degree of homogeneity has been achieved.

The following example illustrates the invention described herein. The apparatus employed in this example is substantially as shown in the drawings (FIGURE 1).

*Example*

A 100,000 pounds capacity storage bin (12 feet in diameter and approximately 33 feet long) was equipped with a 12 inch Schedule 40, type 3003 aluminum pipe (the aspirated tube). This pipe was enclosed by a fenestrated tube 16 inches in diameter and attached to the aspirated tube by a metal ring which closes the top of the annulus defined by the aspirated tube and the fenestrated tube. The fenestrated tube contained 104 holes 1⅜ inches in diameter and a conical baffle having a base diameter of 6 feet. The baffles formed a clearance of approximately 10 inches with the bin walls.

The upper half of the holes in the fenestrated tube were provided with shrouds which were constructed from 1 inch aluminum pipe cut in 2-inch lengths at 45° angle (FIGURE 3) and extending approximately 1⅛ inches in the annulus. The lower end of the fenestrated tube is provided with deflecting edges as shown in FIGURES 1 and 2.

85,000 pounds of resin containing known quantity of colored pellets were blended in the bin by passing air both through the flow-accelerating means and the secondary air conduit, both as shown in FIGURE 1. After 2 hours of blending in the bin the colored pellets had been uniformly distributed throughout the resin as determined by determining the number of colored pellets in successive five pound samples which had been withdrawn from the bin.

What is claimed is:
1. Apparatus for blending free-flowing granular materials comprising a chamber having a wall which converges toward and terminates in an outlet, a substantially vertically positioned fenestrated tube spaced above said outlet and having a plurality of entrance means therein and a divergent baffle mounted below substantially all of said entrance means, said baffle being so spaced as to define an annular clearance with the wall of said chamber, an aspirated tube extending substantially vertically through and coaxially with said fenestrated tube and defining an annular space between said fenestrated tube and said aspirated tube, a first air inlet means extending upwardly in the lower section of said chamber and terminating at the lower end of said aspirated tube, a flow-accelerating means provided at the end of said air inlet means, and a second air inlet means at a point below the lower end of said aspirated tube.

2. The apparatus of claim 1 wherein the entrance means in said fenestrated tube are spaced equidistantly.

3. Apparatus for blending free-flowing granular materials comprising a chamber having a wall which converges toward and terminates in an outlet, a substantially vertically positioned fenestrated tube spaced above said outlet and having a plurality of entrance means therein and a divergent baffle mounted below substantially all of said entrance means, said baffle being so spaced as to define an annular clearance with the wall of said chamber, an aspirated tube extending substantially vertically through and coaxially with said fenestrated tube and defining an annular space between said fenestrated tube and said aspirated tube, individual shrouding means for each respective entrance means in said fenestrated tube, a first air inlet means extending upwardly in the lower section of said chamber and terminating at the lower end of said aspirated tube, a flow-accelerating means provided at the end of said air inlet means, and a second air inlet means at a point below the lower end of said aspirated tube.

4. The apparatus of claim 3 wherein said entrance means are spaced equidistantly.

5. The apparatus of claim 3 wherein said shrouding means consist of a substantially cylindrical member attached to said fenestrated tube at the entrance means and inwardly sloped and downwardly extending partially into the annulus defined by said fenestrated tube and aspirated tube.

References Cited by the Examiner

UNITED STATES PATENTS

| | | | |
|---|---|---|---|
| 2,723,838 | 11/1955 | Peters | 259—4 |
| 3,029,986 | 4/1962 | Horn | 222—478 |
| 3,145,975 | 8/1964 | Towns | 259—95 |

FOREIGN PATENTS 523,717  11/1953  Belgium.

WALTER A. SCHEEL, *Primary Examiner.*

ROBERT W. JENKINS, *Examiner.*